United States Patent
Aitharaju et al.

(10) Patent No.: US 12,266,813 B2
(45) Date of Patent: Apr. 1, 2025

(54) HYBRID COMPOSITE MATERIALS SYSTEMS FOR BATTERY HOUSINGS HAVING IMPROVED THERMAL PERFORMANCE

(71) Applicant: GM GLOBAL TECHNOLOGY OPERATIONS LLC, Detroit, MI (US)

(72) Inventors: Venkateshwar R. Aitharaju, Troy, MI (US); Xiaosong Huang, Novi, MI (US); Bhavesh Shah, Troy, MI (US); Gustavo Cibrian Salazar, Belle River (CA); Su Jung Han, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 13 days.

(21) Appl. No.: 17/472,210

(22) Filed: Sep. 10, 2021

(65) Prior Publication Data
US 2023/0142691 A1    May 11, 2023

(51) Int. Cl.
*H01M 50/231* (2021.01)
*H01M 50/209* (2021.01)
(Continued)

(52) U.S. Cl.
CPC ....... *H01M 50/231* (2021.01); *H01M 50/209* (2021.01); *H01M 50/224* (2021.01); *H01M 50/227* (2021.01); *H01M 50/233* (2021.01)

(58) Field of Classification Search
CPC ........... H01M 50/2331; H01M 50/227; H01M 50/209; H01M 50/224; H01M 50/231–233; H01M 10/653–659
See application file for complete search history.

(56) References Cited

U.S. PATENT DOCUMENTS

| | | | |
|---|---|---|---|
| 7,819,462 | B1 | 10/2010 | Owens |
| 8,033,592 | B2 | 10/2011 | Hsu et al. |
| | | (Continued) | |

FOREIGN PATENT DOCUMENTS

| | | |
|---|---|---|
| CN | 115799738 A | 3/2023 |
| DE | 102022119828 A1 | 3/2023 |

*Primary Examiner* — Milton I Cano
*Assistant Examiner* — Albert Michael Hilton
(74) *Attorney, Agent, or Firm* — Harness, Dickey & Pierce, P.L.C.

(57) ABSTRACT

A hybrid material housing for a battery reduces or minimizes thermal runaway propagation. The housing includes a composite structure for the battery and optionally includes a polymeric matrix selected from the group consisting of: epoxy, phenolic resin, polyester, vinyl ester, and combinations thereof and a reinforcing material selected from the group consisting of: glass fibers, carbon fibers, basalt fibers, aromatic polyamide KEVLAR® fibers, and combinations thereof. A metal layer is disposed along an exterior surface of the composite structure that comprises aluminum, steel, stainless steel, alloys, and combinations thereof. In a first mode, the metal layer contacts the composite structure and in a second mode after exposure to a thermal load of greater than or equal to about 500° C., the metal layer at least partially delaminates from the exterior surface and forms insulating air gaps to define a thermal barrier. Methods of forming the hybrid material housings are also provided.

20 Claims, 3 Drawing Sheets

(51) Int. Cl.
  *H01M 50/224*  (2021.01)
  *H01M 50/227*  (2021.01)
  *H01M 50/233*  (2021.01)

(56) References Cited

U.S. PATENT DOCUMENTS

| | | | |
|---|---|---|---|
| 10,490,785 B1* | 11/2019 | Simontacchi | H01M 50/231 |
| 10,665,913 B2 | 5/2020 | Syed et al. | |
| 10,749,146 B2 | 8/2020 | Berger et al. | |
| 2006/0106147 A1 | 5/2006 | Fasulo et al. | |
| 2006/0199890 A1 | 9/2006 | Fasulo et al. | |
| 2006/0204819 A1* | 9/2006 | Murakami | H01M 8/0213 |
| | | | 523/450 |
| 2007/0299185 A1 | 12/2007 | Ottaviani et al. | |
| 2010/0098925 A1 | 4/2010 | Fasulo et al. | |
| 2011/0121225 A1 | 5/2011 | Posudievsky et al. | |
| 2013/0216887 A1* | 8/2013 | Wayne | H01M 10/6551 |
| | | | 165/185 |
| 2016/0126535 A1* | 5/2016 | Qiao | H01M 10/0481 |
| | | | 29/623.5 |
| 2016/0181590 A1* | 6/2016 | Fan | H01M 50/581 |
| | | | 429/61 |
| 2017/0022703 A1* | 1/2017 | Buttner | E04C 2/46 |
| 2017/0362401 A1 | 12/2017 | Seidel et al. | |
| 2019/0135995 A1* | 5/2019 | Mizuta | B29B 15/08 |
| 2019/0348725 A1* | 11/2019 | Golubkov | H01M 50/119 |
| 2020/0002552 A1* | 1/2020 | Song | C09D 175/06 |
| 2023/0191751 A1* | 6/2023 | Bem | B32B 37/1045 |
| | | | 428/319.1 |

\* cited by examiner

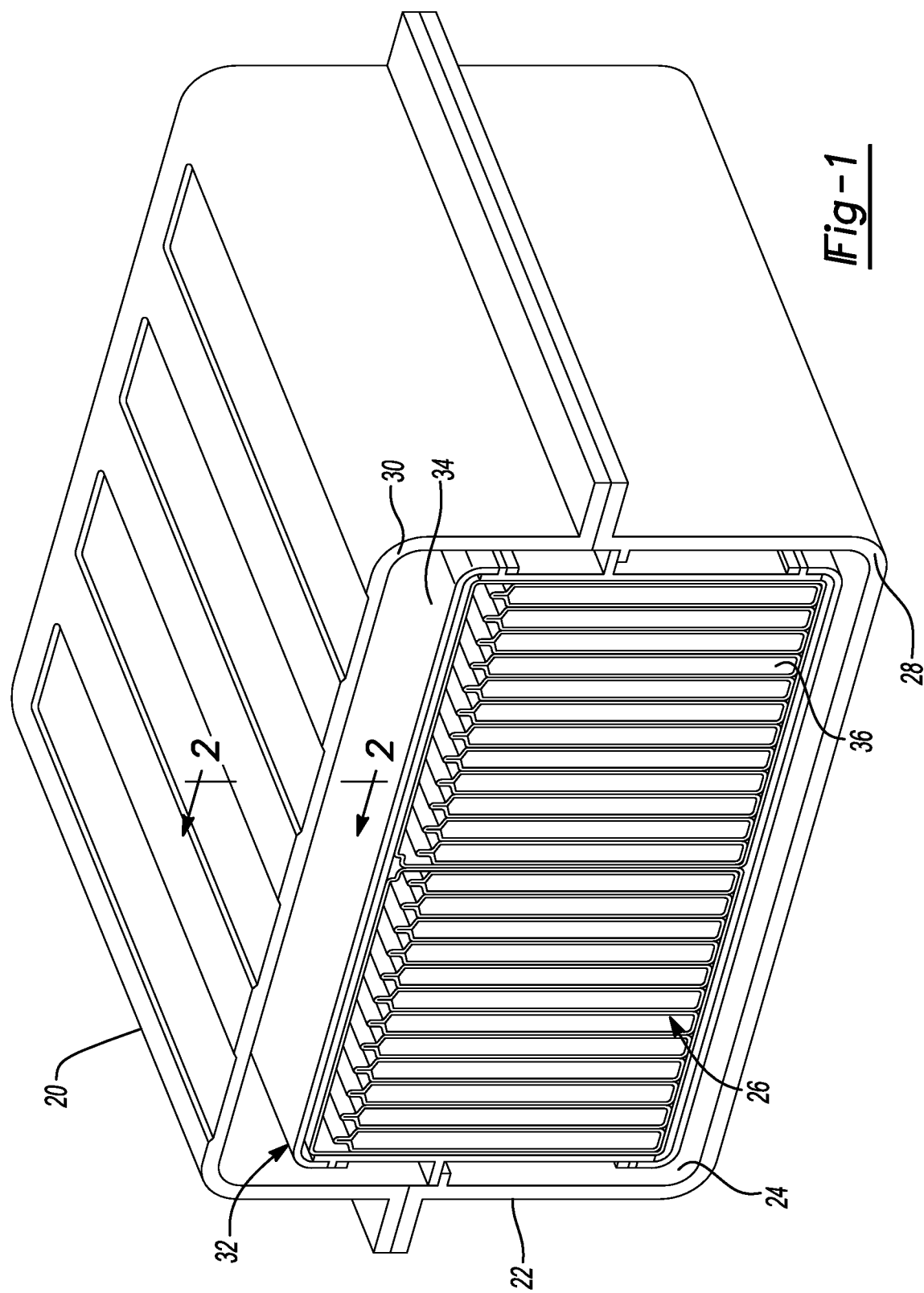

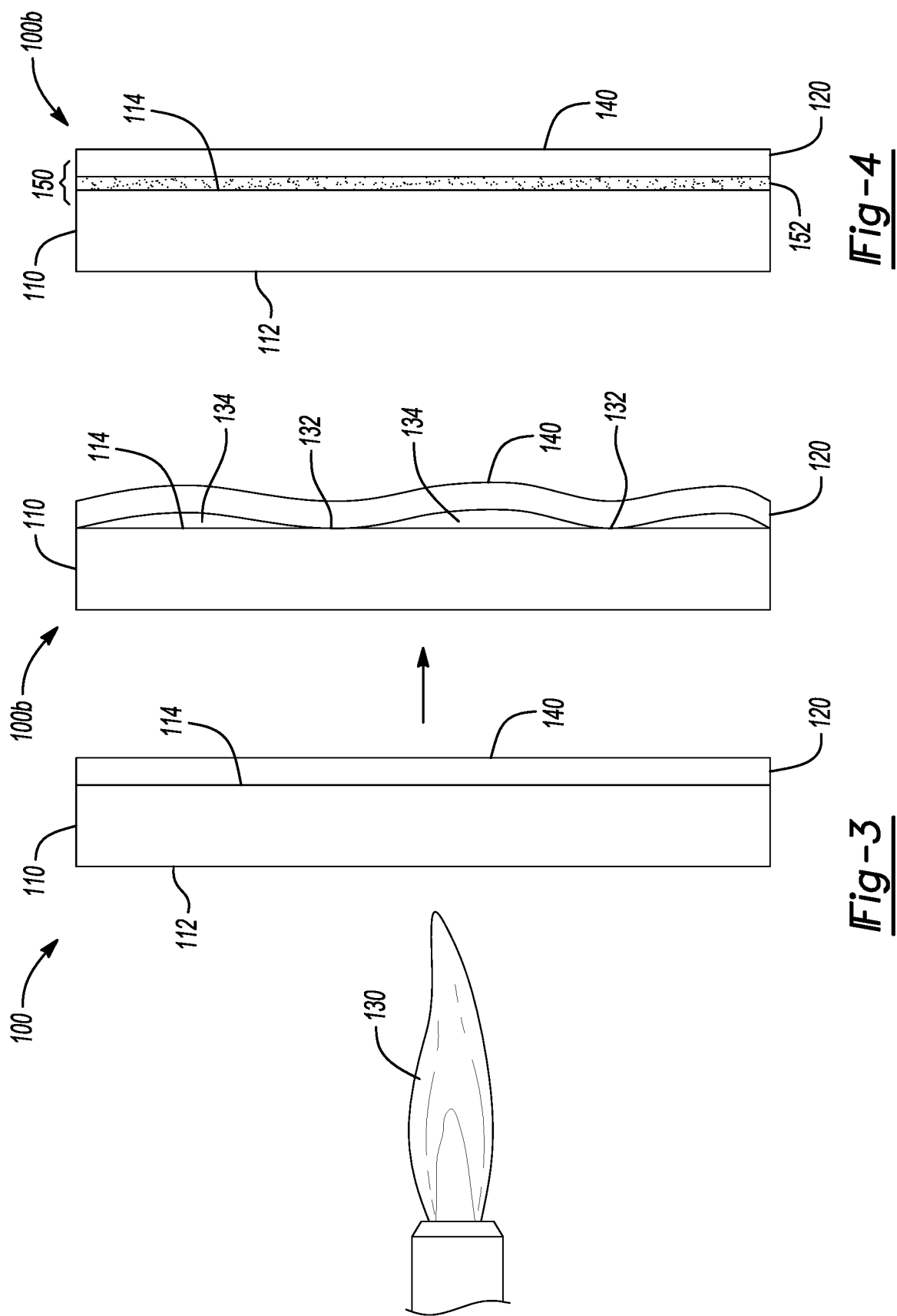

HYBRID COMPOSITE MATERIALS SYSTEMS FOR BATTERY HOUSINGS HAVING IMPROVED THERMAL PERFORMANCE

INTRODUCTION

This section provides background information related to the present disclosure which is not necessarily prior art.

The present disclosure relates to housings or covers for electrochemical cells/batteries that provide a thermal barrier to reduce or minimize thermal runaway propagation events.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Lithium-ion electrochemical or batteries typically comprise a plurality of cells that may be electrically connected in a stack to increase overall output. In particular, the battery cells may include alternating positive electrodes and negative electrodes with separators disposed there between to define a stack. These battery cells thus form battery modules. The modules may be assembled into a battery pack that is disposed in an encasement or battery housing or cover.

To reduce weight and enhance gravimetric efficiency, battery housings or covers may be formed of reinforced composite materials rather than metals. However, during a thermal runaway propagation (TRP) event, it would be advantageous if the housing has a thermal barrier or self-extinguishing behavior to avoid burning of the reinforced composite material.

SUMMARY

This section provides a general summary of the disclosure, and is not a comprehensive disclosure of its full scope or all of its features.

The present disclosure relates to a hybrid material housing for a battery pack for reducing or minimizing thermal runaway propagation. In certain aspects, the housing includes a composite structure defining an interior surface and an exterior surface. The composite structure includes a polymeric matrix and a reinforcing material distributed therein. The hybrid material housing also includes a metal layer disposed along the exterior surface of the composite structure. In a first operational mode, the metal layer contacts the composite structure. In a second operational mode, after exposure to a thermal load of greater than or equal to about 500° C., the metal layer at least partially delaminates from the exterior surface and forms insulating air gaps to define a thermal barrier.

In one aspect, the metal layer includes a material selected from the group consisting of: steel, stainless steel, aluminum, alloys, and combinations thereof.

In one aspect, the metal layer has a thickness of greater than or equal to about 0.02 mm to less than or equal to about 0.5 mm. The composite structure has a thickness of greater than or equal to about 1.5 mm to less than or equal to about 4 mm.

In one aspect, the polymeric matrix is selected from the group consisting of: epoxy, phenolic resin, polyester, vinyl ester, and combinations thereof and the reinforcing material is selected from the group consisting of: glass fibers, carbon fibers, basalt fibers, aromatic polyamide fibers, and combinations thereof.

In one aspect, the reinforcing material is present at greater than or equal to about 25% by volume to less than or equal to about 70% by volume in the composite structure and the polymeric matrix is present at greater than or equal to about 30% by volume to less than or equal to about 75% by volume in the composite structure.

In one aspect, the composite structure further includes: (i) at least one thermal barrier material distributed within the polymeric matrix, (ii) at least one surface layer including a thermal barrier material distributed therein, or (i) and (ii).

In one further aspect, at least one thermal barrier material is selected from the group consisting of: expanded graphite, ammonium polyphosphate (APP), alumina trihydrate (ATH), and combinations thereof.

In one further aspect, the composite structure includes (i) at least one thermal barrier material distributed within the polymeric matrix. At least one thermal barrier material is present at greater than or equal to about 3% by weight to less than or equal to about 30% by weight of the composite structure.

In one aspect, the metal layer includes a coating including a thermal barrier material.

In one further aspect, the coating includes expanded graphite.

In one aspect, the hybrid material housing further includes an adhesive disposed between the exterior surface of the composite structure and the metal layer. The adhesive has a ductility value of greater than or equal to about 2% to less than or equal to about 20% at a temperature above about 200° C.

In one aspect, the hybrid material housing further includes an adhesive disposed between the exterior surface of the composite structure and the metal layer.

In one further aspect, the adhesive includes expanded graphite.

The present disclosure also relates to a hybrid material housing for a battery pack for reducing or minimizing thermal runaway propagation. The hybrid material housing includes a composite structure defining an interior surface and an exterior surface. The composite structure includes a polymeric matrix selected from the group consisting of: epoxy, phenolic resin, polyester, vinyl ester, and combinations thereof and a reinforcing material selected from the group consisting of: glass fibers, carbon fibers, basalt fibers, aromatic polyamide fibers, and combinations thereof distributed in the polymeric matrix. The hybrid material housing also includes a metal layer disposed along the exterior surface of the composite structure. The metal layer is selected from the group consisting of: aluminum, steel, stainless steel, alloys, and combinations thereof. In a first operational mode, the metal layer contacts the composite structure. In a second operational mode after exposure to a thermal load of greater than or equal to about 500° C., the metal layer at least partially delaminates from the exterior surface and forms insulating air gaps to define a thermal barrier. Further, in the second operational mode, the composite structure remains intact free of any openings.

In one aspect, the composite structure further includes: (i) at least one thermal barrier material distributed within the polymeric matrix, (ii) at least one surface layer including a thermal barrier material distributed therein, or (i) and (ii).

In one further aspect, the at least one thermal barrier material is selected from the group consisting of: expanded graphite, ammonium polyphosphate (APP), alumina trihydrate (ATH), and combinations thereof.

In one aspect, the composite structure includes (i) at least one thermal barrier material distributed within the polymeric matrix. The at least one thermal barrier material is present at greater than or equal to about 3% by weight to less than or equal to about 30% by weight of the composite structure.

In one aspect, the metal layer includes a coating including expanded graphite.

In one aspect, the hybrid material housing further includes an adhesive disposed between the exterior surface of the composite structure and the metal layer. The adhesive (i) has a ductility value of greater than or equal to about 2% to less than or equal to about 20% at a temperature above about 200° C.

The present disclosure further relates to a method of forming a hybrid material housing for a battery for reducing or minimizing thermal runaway propagation. The method includes disposing a metal layer into a cavity of a mold. The method also includes disposing a reinforcing material and a polymer or precursor of a polymer into the cavity of the mold adjacent to the metal layer. The polymer or precursor is solidified to form a composite material including a polymeric matrix having the reinforcing material disposed therein. The mold is opened to remove a hybrid material housing for a battery pack including a composite structure formed of the composite material and having an integrally formed metal layer adjacent thereto.

In one aspect, after the disposing the reinforcing material, the method further includes at least one of: heating the mold and applying pressure to the mold for compression.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is a perspective view of an example of a composite battery cover or housing having a battery with various components disposed therein;

FIG. 3 shows a side sectional view of a hybrid material housing for a battery for reducing or minimizing thermal runaway propagation with a composite structure and metal layer prepared in accordance with certain aspects of the present disclosure in a first operational mode followed by exposure to a heat source in the form of a test torch flame that transforms to a second operational mode, where the metal layer is delaminated in select regions from the composite structure to form a thermal barrier.

FIG. 4 shows a side sectional view of yet another variation of a hybrid material housing for a battery for reducing or minimizing thermal runaway propagation where a coating having a thermal barrier material is disposed on a metal layer that interfaces with a composite structure in accordance with certain aspects of the present disclosure.

Corresponding reference numerals indicate corresponding parts throughout the several views of the drawings.

DETAILED DESCRIPTION

Figure 2A:
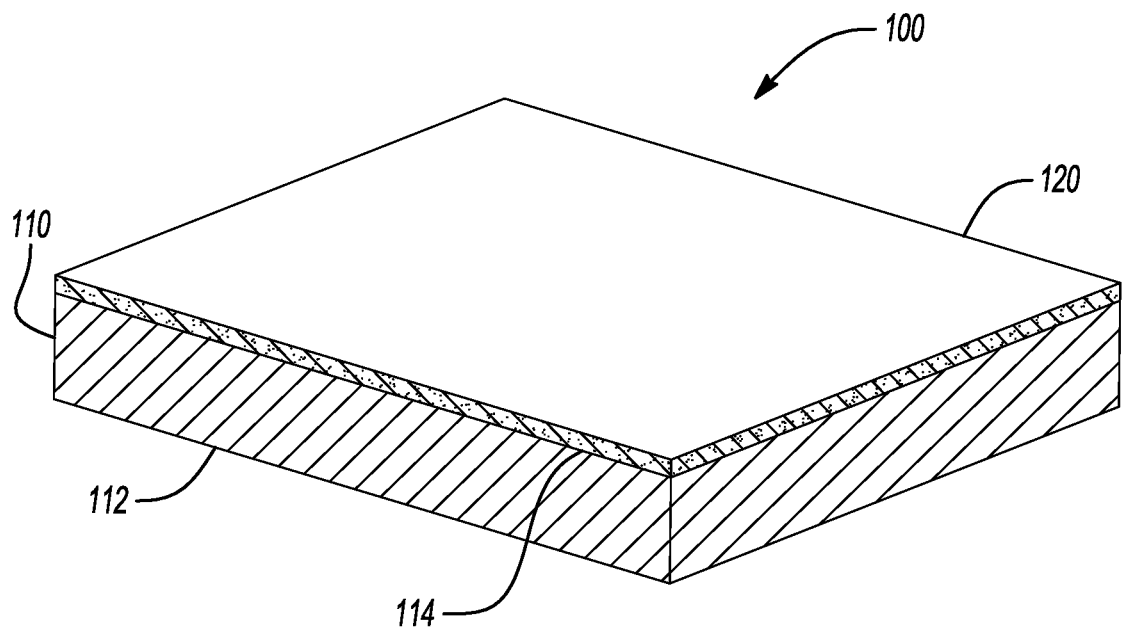
FIGS. 2A-2B shows perspective views of a hybrid material housing for a battery for reducing or minimizing thermal runaway propagation with a composite structure and metal layer prepared in accordance with certain aspects of the present disclosure in a first operational mode in FIG. 2A and in a second operational mode in FIG. 2B, where the metal layer is delaminated in select regions from the composite structure to form a thermal barrier.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides a housing or encasement for a battery for reducing or minimizing thermal runaway propagation. A housing is generally understood to be a physical structure that is rigid and houses a plurality of electrochemical cells that form a plurality of modules in a battery pack. The housing protects the battery pack and any other internal components from an external environment, including external forces. The housing may also be referred to as a cover or an encasement. Notably, the concepts described herein may be used to form other protective structures that encase other subcomponents within a battery.

FIG. 1 shows one non-limiting example of a battery housing 20 for a lithium ion battery. The housing has an exterior surface 22 and an interior surface 24 that faces an interior compartment 26. The housing 20 may be an assembly of distinct components or parts that are joined together to define a protective structure that encases interior components, for example, a lower tray cover 28 and an upper battery pack cover 30. The present technology contemplates at least the upper battery back cover 30 being formed of a hybrid material, as described further below.

A battery pack 32 is disposed in the interior compartment 26 that includes one or more battery modules 34 (only a single module is shown in FIG. 1 for purposes of illustration, but as appreciated by those of skill in the art, there may in fact be multiple modules within the battery pack 32). Each battery module 34 generally includes a plurality of battery cells 36 (that may be provided in subassemblies of stacks or blocks) that may be disposed in a frame or other structure in each battery module 34 for protection from external forces or heat. Any number of the cells, blocks and/or battery modules may be selected and connected to a positive or negative source terminal. The cells, blocks and battery modules may be connected: in series and/or in parallel; in different connected configurations; and may be organized into blocks, packs, and/or groups. The battery cells 36 and module(s) 34 may be connected and controlled via a battery management system (BMS—not shown in FIG. 1) that can help to control and manage various aspects of the battery operation, including power output, voltage, current, temperature, SOX, and the like. The battery housing 20 thus can encase battery pack 32 thus includes one or more battery modules 34, the BMS, and optionally a cooling system (not shown). These are contained in the interior compartment 26 of the battery housing 20 along with any other electrical conduits or conventional components, such as bus bars, circuitry, and portions of terminals for external connection to a load and power source.

In various aspects, the present disclosure comprises a housing for a battery for reducing or minimizing thermal runaway propagation (TRP), which may be an uncontrolled high temperature thermal event, including a conflagration or fire. As referred to herein, such a TRP event may be caused by a thermal load that is excessive and beyond the range of normal operational temperatures. By way of example, a TRP may result if a short circuit arises within the battery. For example, a source of heat or flame in a thermal runaway propagation event may exceed temperatures of about 500° C., optionally about 600° C., optionally about 700° C., optionally about 800° C., optionally about 900° C. optionally about 1,000° C., optionally about 1,100° C., and optionally may exceed about 1,200° C. The source of heat or flame may originate in the interior compartment of the battery housing or module. The housing includes a composite structure that is formed of a polymeric composite material that includes a polymeric matrix and a reinforcing material (e.g., a plurality of particles or fibers) distributed therein. The composite material may thus have a reinforcing or filler material in the form of fibers or particles dispersed in a polymeric matrix.

The polymer matrix may be formed from any kind of suitable precursor or resins. For example, thermoset resins are cured from a liquid precursor to form a polymer. For thermoplastic polymer matrix materials, the polymers melt to a liquid state or dissolved in a solvent to form a solution before the fibers are added creating the composites. By way of non-limiting example, in certain variations, the polymer matrix precursors may include: epoxy (where hydroxyl groups, such as bisphenol A and bisphenol B, are reacted with epichlorhydrin), phenolic resins (phenolic resins may be formed by a reaction of phenol or substituted phenol with formaldehyde), polyester, vinyl ester, and combinations thereof.

Suitable non-limiting examples of reinforcing fibers for the polymeric composite include carbon fibers, glass fibers (such as fiber glass or quartz), basalt fibers, aromatic polyamide fibers, such as an aramid or para-aramid fiber commercially available from DuPont as KEVLAR™ fibers, and combinations thereof. The fibers may be continuous or randomly distributed individual fibers within the resin matrix or provided as fiber mats or fabric having interconnecting or contacting fibers. Suitable fibers may include chopped or continuous fibers. In certain aspects, fiber may be relatively short length fibers (having lengths of ≥ about 0.1 mm to ≤ about 10 mm), relatively long length fibers (having lengths of ≥ about 10 mm to ≤ about 100 mm), or continuous fibers (having lengths of ≥ about 100 mm), and may include any combinations thereof. Long length fibers can provide good balance of moldability/productivity/mechanical performance.

The fibers within the polymeric composite material may be in a randomly-oriented manner, for example, in a substantially two-dimensionally-randomly oriented or in a specific-direction-oriented manner (e.g., anisotropic). In certain variations, a fiber mat may be used with highly planar oriented or uni-directional oriented fibers or a combination thereof. Alternatively, a random fiber mat can be used.

In certain aspects, glass fibers may be used that are either continuous or discontinuous in the polymeric composite. In another aspect, carbon fibers may be used that are either continuous or discontinuous in the polymeric composite that may have a yield strength of greater than or equal to about 4,000 MPa to less than or equal to about 5,000 MPa.

The reinforcing material (e.g., fibers) may be present in the polymeric composite at greater than or equal to about 25% by volume to less than or equal to about 70% by volume, optionally greater than or equal to about 35% by volume to less than or equal to about 60% by volume where the polymeric matrix may be present at greater than or equal to about 30% by volume to less than or equal to about 75% by volume, optionally about greater than or equal to about 40% by volume to less than or equal to about 70% by volume. In certain aspects, the reinforcing material may be homogeneously distributed within the polymeric matrix.

The fiber reinforced composite material may further include other conventional ingredients, including other reinforcement materials, functional fillers or additive agents, like organic/inorganic fillers, fire-retardants, anti-ultraviolet radiation agents (UV stabilizers), anti-oxidants, colorants or pigments, such as carbon black powder, mold release agents, softeners, plasticizing agents, surface active agents, and the like.

In one variation, the composite material comprises an epoxy resin with glass and/or carbon fibers as the reinforcing material distributed therein. In another variation, the composite material comprises a phenolic resin with glass and/or carbon fibers as the reinforcing material distributed therein. Phenolic resins exhibit high heat resistance and low flammability that is advantageous when used in a composite material used as a thermal barrier in accordance with certain aspects of the present disclosure. However, without some of the modifications contemplated by the present teachings, use of a phenolic resin reinforced composite alone under certain conditions may not be sufficient to withstand the composite material burning through.

In certain other variations, the reinforcement may be that of a sheet molding compound (SMC), which typically comprise a glass fiber reinforced thermosetting polymer composition. In certain aspects, the composite material may be a sheet molded compound (SMC) having a plurality of fibers imbibed with a phenolic resin.

In other aspects, the polymeric composite structure may be composed of any fiber-reinforced composite material disclosed in U.S. Pat. Nos. 9,650,003, 9,592,853, and U.S. Publication No. 2015/0108793, each of which is respectively incorporated herein by reference in its entirety.

In accordance with certain aspects of the present disclosure, the composite material may include one or more thermal barrier materials that enhance the thermal barrier properties, such as intumescent or fire retardant materials, in addition to including a reinforcing material described above to provide mechanical strength to the composite material. Intumescent materials are generally those that swell or increase in volume when exposed to high temperatures, such as flames, which help stop or reduce thermal propagation there through. For example, by increasing in volume, the intumescent materials may block the flow of oxygen needed for propagation of a flame. In certain variations, a suitable intumescent material may be expandable graphite. In another variation, fire retardant materials may be included in the composite material, which similarly help to slow or inhibit the spread of fire and flames. Suitable fire retardant materials include ammonium polyphosphate (APP), alumina trihydrate (ATH), and combinations thereof. Thus, in certain aspects, the polymeric material comprises a thermal barrier material selected from the group consisting of: expandable graphite, ammonium polyphosphate (APP), alumina trihydrate (ATH), and combinations thereof. The thermal barrier material may be mixed into the polymeric composite at amounts of greater than or equal to about 3% by weight volume fraction to less than or equal to about 30% by weight volume fraction, optionally greater than or equal to about 3% by weight volume fraction to less than or equal to about 20% by weight volume fraction. In this case, when thermal barrier material is added, a weight volume fraction of reinforcing fiber would accordingly be reduced. Thus, a volume fraction of the resin is maintained at the levels specified earlier, for example, at greater than or equal to about 30% to less than or equal to about 75%.

In other variations, a thermal barrier material may be applied as a coating to one or more surfaces of the composite structure comprising the composite material. For example, the thermal barrier material, such as an intumescent material, may be mixed with a binder and applied as a layer over the surface of the composite material to define an intumescent coating. Suitable binders may include thermoplastic binders, such as polyesters or thermoset binders, such as epoxies.

Figure 2B:
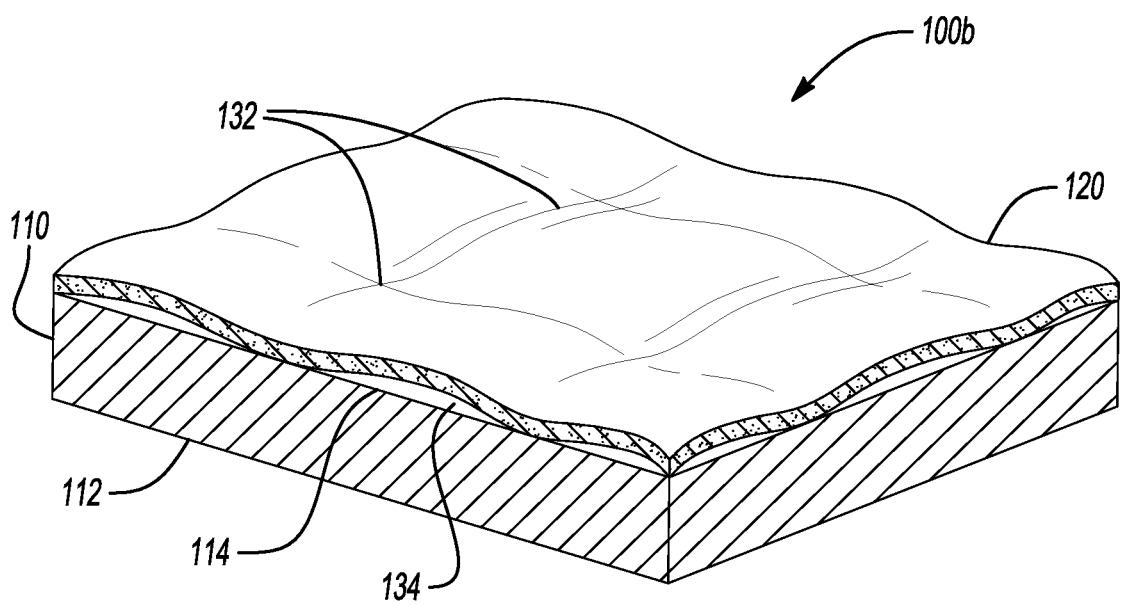

In certain aspects, the present disclosure contemplates a battery housing that is an assembly of distinct materials having distinct coefficients of thermal expansion, such as that shown in FIGS. 2A-2B and 3. In this manner, the assembly creates a strategic separation and/or delamination between the distinct materials (e.g., between the composite structure and a metal surface) during a battery thermal runaway propagation (TRP) event and thus creates a fire-retardant thermal barrier at the interface, effectively lowering the temperature on the back surface of the metallic plate or layer as will be described further herein.

For example, an assembly 100 in FIGS. 2A and 3 includes composite structure 110 defining an interior facing first surface 112 that faces an interior compartment of the battery (interior compartment 26 shown in FIG. 1) and an exterior facing second surface 114. In a TRP event, the source of heat may occur in the battery pack and therefore originates in the interior compartment. In the assembly 100, the composite structure 110 would thus be in direct contact with the thermal source. The composite structure may be formed of a composite material as described above, which includes a polymeric matrix and a reinforcing material distributed therein. The composite structure has a first coefficient of thermal expansion. In certain aspects, the first coefficient of thermal expansion (CTE)/first coefficient of linear thermal expansion (CLTE) of the composite structure may be greater than 0 to less than or equal to $10 \times 10^{-6}$ in a direction of the fibers (when the fibers are aligned) and about $30 \times 10^{-6}$ to $50 \times 10^{-6}$ in a transverse direction. Generally, the coefficient of thermal expansion in a composite is dependent upon direction, where directions parallel to the fiber orientation are lower and those orthogonal or perpendicular to the fiber orientation are higher.

A thickness of the composite layer may be greater than or equal to about 1.5 mm to less than or equal to about 4 mm. For example, a glass or carbon fiber epoxy composite may have a thickness of greater than or equal to about 1.5 mm to less than or equal to about 4 mm. A sheet molded compound with glass or carbon fiber and a phenolic resin may have a thickness of greater than or equal to about 2.5 mm to less than or equal to about 4 mm.

The assembly 100 also includes a metal layer 120 disposed along the exterior facing second surface 114 of the composite structure 110 (and thus on an exposed side opposite to an interior compartment of the housing), where the metal layer 120 has a second coefficient of thermal expansion (CTE)/coefficient of linear thermal expansion (CLTE) different from the first coefficient of thermal expansion (CLTE). Generally, metallic materials are substantially isotropic in terms of the CLTE. In accordance with the present teachings, a difference of CLTE between the respective components of composite structure and metallic layer is maximized, so that a thermal coefficient of linear expansion of metal and the composite measured in the two orthogonal directions creates a strategic delamination.

For example, a second CLTE of metal may be juxtaposed in relation to and compared with a highest CLTE of the composite structure to have a maximal difference in CLTE. For example, the difference in CLTE ($\Delta\alpha$) may be calculated in a particular direction by the following equation=$\Delta\alpha = (\alpha_{mi} - \alpha_{ci})$, where a is a CLTE in a predetermined direction, i is 1, 2; m is the metal, and c is the composite. In certain aspects, the metal layer may comprise aluminum, steel, stainless steel, and any alloys or combined layers thereof. The second linear coefficient of linear thermal expansion (CLTE) for aluminum is $2.1 \times 10^{-6}$ to $2.4 \times 10^{-6}$. The CLTE for steel is $1.1 \times 10^{-6}$ to $1.3 \times 10^{-6}$. In this manner, in various aspects of the present technology, a largest difference between the respective components of thermal coefficient of expansion of metal and the composite measured in the two orthogonal directions helps to create a strategic delamination.

The metal layer may be a foil or thin layer. A thickness of the metal layer may be greater than or equal to about 0.02 mm to less than or equal to about 0.5 mm. For example, an aluminum layer may have a thickness of greater than or equal to about 0.1 mm to less than or equal to about 0.5 mm. A steel layer may have a thickness of greater than or equal to about 0.02 mm to less than or equal to about 0.1 mm.

The metal plate 120 may be bonded to the composite structure's 110 exterior facing second surface 114 or integrally molded with the composite structure 110. In certain aspects, while not shown in FIG. 3, an adhesive may be used to bond the exterior facing second surface 114 of the composite structure 110 to the metal layer 120. In certain variations, an adhesive has low ductility at high temperatures, for example, with a ductility value of about 2% to about 20% at a temperature above about 200° C. The adhesive may contain one or more intumescent materials, such as expandable graphite discussed above, which may increase in volume when exposed to an excessive thermal load. In this way, the adhesive promotes a desirable amount of delamination during a thermal event. In certain aspects, the adhesive may be an epoxy adhesive or a polyurethane adhesive. Low ductility adhesives are selected so that they can easily fail at elevated temperatures in a TRP event. The adhesive may be applied to coat the entire exterior facing second surface 114 or may be discontinuous, such as being applied in lines, mesh, dots, and the like. As will be described further below, in certain formation methods, the metal layer may instead be disposed in a mold or die where the composite is molded or formed adjacent to it, so that the two materials form an integral assembly.

FIGS. 2A and 3 shows the assembly 100 in a first operational mode where the metal layer 120 is in contact with the composite structure 110 and FIGS. 2B and 3 show an assembly 100B in a second operational mode after exposure to a thermal load 130 adjacent to the interior facing first surface 112 of the composite structure 110, such as a flame or as shown in FIG. 3, a torch that generates a test flame as part of a torch test. As noted above, the thermal load 130 may have a temperature of greater than or equal to about 500° C., optionally greater than or equal to about 600° C., optionally greater than or equal to about 700° C., optionally greater than or equal to about 800° C., optionally greater than or equal to about 900° C., optionally greater than or equal to about 1,000° C., optionally greater than or equal to about 1,100° C., and optionally may exceed greater than or equal to about 1,200° C. Notably, the setup shown simulates the thermal load 130 being generated from within the battery housing as would potentially occur during battery operation and use, so that the thermal load/flame 130 first contacts the interior facing first surface 112 of the composite structure 110.

As noted above, after exposure to the thermal load 130, the assembly 100B is in a second operational mode, where the metal layer 120 at least partially delaminates from the exterior facing second surface 114 of the composite structure 110. In this manner, as the metal layer 120 separates in a select regions from the exterior facing second surface 114, for example, remaining attached to the exterior facing second surface 114 in certain anchored first regions 132, while being separated and delaminated in other regions that creates a plurality of insulating air gaps 134 defined between the exterior facing second surface 114 of the composite structure 110 and the metal layer 120 that define a thermal barrier. The plurality of insulating air gaps 134 minimize flame propagation and serve to assist in protecting the composite structure 110 from burning through or reaching temperatures that result in forming breaches or openings in the composite structure 110. Further, this fire-retardant thermal barrier at the interface between the composite structure 110 and the metal layer 120 effectively lowers the temperature on a back surface 140 of the metallic layer and draws heat away from the composite structure 110. The delaminated metal layer 120 thus enhances thermal dissipation. As described above, in this variation, a strategic mismatch of the coefficients of thermal expansion (CTE) between the composite structure and metallic plate maximizes separation between the two distinct materials to create a gap/delamination during a battery thermal event that protects the composite structure and minimizes or prevents it from being burned through (e.g., the thermal load burning the composite to the extent that a through hole, rupture, or opening is formed).

The thermal barrier that is formed by the insulating air gaps 134 defined between the composite structure 110 and the metallic layer 120 can provide endurance at higher temperatures than previous technologies, for example, being able to withstand up to 1,200° C. torch or flame in certain variations. In certain previous technologies, a metal layer facing the interior of a battery housing compartment would be sacrificial and potentially melt when exposed to a thermal load associated with a TRP event without forming a thermal barrier with insulating air gaps.

Moreover, certain previous technologies relied on three or more layers, for example, a polymeric substrate, one or more separate blanket layers, and metallic foil (facing the interior compartment). Such metallic foil and/or blanket layers served as a sacrificial layer to protect the polymeric structure/substrate for a fire extinguishing effect alone. In the present technology, the composite structure itself may be modified without the presence of a separate blanket layer to provide the heat performance desired. Thus, the hybrid material housing may be free of any blanket layers. In other variations, the hybrid material housing may be free of any sacrificial layers (aside from the adhesive that may melt). Further, in certain aspects, the battery housing may consist essentially of, or consist of, the composite structure and the metal layer (with or without at least one surface layer including a thermal barrier material distributed therein and an optional adhesive layer disposed therebetween) described above. As noted above, the metallic layer remains present during and after the TRP event.

Moreover, in certain previous technologies, outgassing relied on cells expelling hot gasses that would make the metallic layer contact the blanket layer during the TRP event, which made it unpredictable or uncertain whether any air gaps would form. In the present embodiments, the metallic layer is disposed on the outside or exterior of the housing, so expelled gases (e.g., from the adhesive or composite structure outgassing) will help to create the air gap between the metallic layer and the composite and thus reliably create a thermal barrier. Notably, the present technology maintains a temperature of the exterior surface of the housing opposite to the flame or torch during the TRP event, so that the metallic layer opposite to the flame/torch is at a lower temperature than a critical value and the surface of the housing/composite structure facing the flame/torch is not breached with any holes or openings during the TRP event.

Other variations of the housing for a battery for reducing or minimizing thermal runaway propagation may have the assembly of materials described in the context of FIGS. 2A-2B and 3, but have additional features in addition or in the alternative. For example, as shown in FIG. 4, an assembly 110B includes the composite structure 110 and metal layer 120 shown in a first operational mode, but which are further separated in a second operational mode (not shown) by further modifying an interface 150 between the exterior facing second surface 114 of the composite structure 110 and metallic layer 120 during a thermal event to create a thermal barrier by adding a coating 152 on the metal layer 120. The coating 152 may comprise a thermal barrier material, such as carbon, silicon carbide (SiC), silicon nitride ($Si_3N_4$) or combinations thereof. In other aspects, the coating 152 may be applied to either the composite structure 110 or the metal layer 120. For example, a coating 152 comprising an intumescent material, such as a layer of expandable graphite, may be disposed on the metal layer 120. Alternatively, the coating 152 may comprise an intumescent material that is mixed with a polymeric binder and applied over the composite fiber preform to coat the exterior facing second surface 114. It should be noted that the coating 152 may be distinct from an adhesive used, and as noted above, if an adhesive is present for bonding the metal layer 120 to the composite structure 110, it may comprise a plurality of particles of a thermal barrier material, such as an expandable graphite intumescent material disposed therein.

The process of forming the hybrid material assembly housing for a battery may include forming a composite structure via compression molding, resin transfer molding, or molding of the sheet molding compound, by way of non-limiting example. The composite structure may be formed integrally or as individual components to be joined or coupled together after the formation process.

In certain aspects, methods of forming a hybrid material housing for a battery for reducing or minimizing thermal runaway propagation are provided. The method comprises disposing a metal layer into a cavity of a mold. The mold may be preheated. Then the method also comprises disposing a reinforcing material and a polymer or precursor of a polymer into the cavity of the mold adjacent to the metal layer. Notably, the reinforcing material and a polymer or precursor of a polymer may alternatively be placed into the mold cavity first and the metal layer placed over the materials afterwards. The method also includes solidifying (e.g., curing, cross-linking, or cooling a melted thermoplastic) the polymer or precursor of the polymer to form a composite material comprising a polymeric matrix having the reinforcing material disposed therein. The method may further comprise at least one of: heating the mold and applying pressure to the mold for compression. Next, the mold may be opened to remove a hybrid material housing for a battery comprising a composite structure formed of the composite material and having an integrally formed metal layer adjacent thereto.

In one variation, the composite structure and the metallic foil or plate may be integrally molded in a compression molding or resin transfer molding process. By way of background, for resin transfer molding (RTM), a dry fiber reinforcement material may be placed into a mold (in this case with a metal foil or plate adjacent to the dry fiber reinforcement material) and resin may be infused into the mold under pressure (e.g., about 10 psi to about 3,000 psi). The mold may first be heated. Injection molding techniques known in the art may also be used to introduce resin into the reinforcement material, particularly where the reinforcement material comprise discontinuous fibers. For example, a precursor comprising a resin and the reinforcement material may be injected or infused into a defined space or mold followed by solidification of the precursor to form the polymeric composite material. The term "injection molding" also includes reaction injection molding using at thermoset resin. In one example, the mold may be heated to about 120° C., then the mold is opened and the reinforcement (e.g., a reinforcement fabric or mat) is placed in the mold with the metal layer adjacent to it. The mold is then closed, vacuum is applied, and a resin, such as an epoxy or phenolic resin, is injected into the mold to fill the mold cavity. The mold may be maintained closed at 120° C. for 3 minutes. The mold is opened and the housing component is ejected.

Another technique may involve compression molding. In certain aspects, a method of compression molding the composite housing assembly may include adding a prepreg of the reinforcing material and resin into a mold along with a metal foil or plate disposed adjacent to it. The assembly is disposed in a mold cavity of a compression mold. In certain variations, the compression mold and mold cavity is optionally pre-heated. The assembly is then compression molded by applying or maintaining heat and applying pressure to form a compression molded consolidated polymeric component. In certain aspects, the assembly remains in the compression mold until the mold is cooled to a predetermined temperature. The mold may be opened and the composite assembly removed from the mold cavity.

In yet other variations, the composite structure may be preformed via a typical composite formation process and then bonded with the metallic layer in a post-molding operation. In this process, the composite and metallic foil are brought together, and an adhesive is disposed between them. Further, using a bonding fixture under compression and heat, the adhesive is allowed to cure and set a bond between the composite and metallic foil. For example, the process of forming the composite structure for the housing may include compression molding, injection molding, pultrusion, resin transfer molding, molding of the sheet molding compound, autoclave molding, vacuum bagging, and hand layup, by way of non-limiting example. The joining of the metal layer/plate may be achieved by applying an adhesive to at least one surface of the composite structure and/or metal layer. The adhesive may be applied discontinuously or continuously in techniques known to those of skill in the art. Where the adhesive comprises a thermal barrier material, the adhesive is mixed with the thermal barrier material and then applied.

While the hybrid material assemblies for battery housings provided by the present technology are particularly suitable for use in components of an automobile or other vehicles (e.g., motorcycles, boats, tractors, buses, motorcycles, trains, mobile homes, campers, and tanks), they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of non-limiting example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid material housing for a battery pack for reducing or minimizing thermal runaway propagation, the housing comprising:
   an interior compartment;
   a battery disposed in the interior compartment;
   a composite structure defining an exterior surface and an opposite interior surface that faces the interior compartment and the battery, wherein the composite structure comprises a polymeric matrix and a reinforcing material distributed therein, the interior surface of the composite structure being an innermost surface of the housing adjacent the interior compartment and the battery;
   a metal layer disposed along the exterior surface of the composite structure, wherein in a first operational mode the metal layer contacts the composite structure and in a second operational mode after the composite structure is exposed to a thermal load originating in the interior compartment of greater than or equal to about 500° C., the metal layer at least partially delaminates from the exterior surface and forms insulating air gaps that define a thermal barrier between the exterior surface of the composite structure and the metal layer; and
   a coating on the metal layer along an interface between the exterior surface of the composite structure and the metal layer, the coating comprising an intumescent material that further separates the metal layer from the composite structure in the second operational mode, wherein the intumescent material comprises expandable graphite.

2. The hybrid material housing of claim 1, wherein the metal layer comprises a material selected from the group consisting of: steel, stainless steel, aluminum, alloys, and combinations thereof.

3. The hybrid material housing of claim 1, wherein the metal layer has a thickness of greater than or equal to about 0.02 mm to less than or equal to about 0.5 mm, while the composite structure has a thickness of greater than or equal to about 1.5 mm to less than or equal to about 4 mm.

4. The hybrid material housing of claim 1, wherein the polymeric matrix is selected from the group consisting of: epoxy, phenolic resin, polyester, vinyl ester, and combinations thereof and the reinforcing material is selected from the group consisting of: glass fibers, carbon fibers, basalt fibers, aromatic polyamide fibers, and combinations thereof.

5. The hybrid material housing of claim 1, wherein the reinforcing material is present at greater than or equal to about 25% by volume to less than or equal to about 70% by volume in the composite structure and the polymeric matrix is present at greater than or equal to about 30% by volume to less than or equal to about 75% by volume in the composite structure.

6. The hybrid material housing of claim 1, wherein the composite structure further comprises at least one of: (i) a thermal barrier material distributed within the polymeric matrix, or (ii) a surface layer comprising a thermal barrier material distributed therein.

7. The hybrid material housing of claim 6, wherein the thermal barrier material is selected from the group consisting of: expandable graphite, ammonium polyphosphate (APP), alumina trihydrate (ATH), and combinations thereof.

8. The hybrid material housing of claim 6, wherein the composite structure comprises the thermal barrier material distributed within the polymeric matrix, wherein the thermal barrier material is present at greater than or equal to about 3% by weight to less than or equal to about 30% by weight of the composite structure.

9. The hybrid material housing of claim 1, further comprising an adhesive disposed between the exterior surface of the composite structure and the metal layer, wherein the adhesive has a ductility value of greater than or equal to about 2% to less than or equal to about 20% at a temperature above about 200° C.

10. The hybrid material housing of claim 1, further comprising an adhesive disposed between the exterior surface of the composite structure and the metal layer, wherein the adhesive comprises expandable graphite.

11. The hybrid material housing of claim 1, wherein the metal layer is not a sacrificial layer, and, in the second operational mode after the interior surface of the composite structure is exposed to the thermal load, the metal layer remains present and does not melt.

12. The hybrid material housing of claim 1, wherein the metal layer has a back surface that faces away from the interior compartment and, after the metal layer at least partially delaminates from the exterior surface of the composite structure, the thermal barrier defined between the exterior surface of the composite structure and the metal layer maintains the back surface of the metal layer at a lower temperature than that of the interior surface of the composite structure.

13. The hybrid material housing of claim 1, wherein the metal layer is configured to transition from the first operational mode to the second operational mode after the interior surface of the composite structure is exposed to a thermal load generated by the battery disposed in the interior compartment.

14. A hybrid material housing for a battery pack for reducing or minimizing thermal runaway propagation, the housing comprising:
an interior compartment;
a battery disposed in the interior compartment;
a composite structure defining an exterior surface and an opposite interior surface that faces the interior compartment and the battery, wherein the composite structure comprises a polymeric matrix selected from the group consisting of: epoxy, phenolic resin, polyester, vinyl ester, and combinations thereof and a reinforcing material selected from the group consisting of: glass fibers, carbon fibers, basalt fibers, aromatic polyamide fibers, and combinations thereof distributed in the polymeric matrix, the interior surface of the composite structure being an innermost surface of the housing adjacent the interior compartment and the battery;
a metal layer disposed along the exterior surface of the composite structure, wherein the metal layer is selected from the group consisting of: aluminum, steel, stainless steel, alloys, and combinations thereof, wherein in a first operational mode the metal layer contacts the composite structure and in a second operational mode after exposure to a thermal load originating in the interior compartment of greater than or equal to about 500° C., the metal layer at least partially delaminates from the exterior surface and forms insulating air gaps that define a thermal barrier between the exterior surface of the composite structure and the metal layer, and wherein, in the second operational mode, the composite structure and the metal layer remain intact free of any openings; and
a coating on the metal layer along an interface between the exterior surface of the composite structure and the metal layer, the coating comprising an intumescent material that further separates the metal layer from the composite structure in the second operational mode, wherein the intumescent material comprises expandable graphite.

15. The hybrid material housing of claim 14, wherein the composite structure further comprises at least one of: (i) a thermal barrier material distributed within the polymeric matrix, or (ii) a surface layer comprising a thermal barrier material distributed therein.

16. The hybrid material housing of claim 15, wherein the thermal barrier material is selected from the group consisting of: expandable graphite, ammonium polyphosphate (APP), alumina trihydrate (ATH), and combinations thereof.

17. The hybrid material housing of claim 14, wherein the composite structure comprises the thermal barrier material distributed within the polymeric matrix, wherein the thermal barrier material is present at greater than or equal to about 3% by weight to less than or equal to about 30% by weight of the composite structure.

18. The hybrid material housing of claim 14, further comprising an adhesive disposed between the exterior surface of the composite structure and the metal layer, wherein the adhesive (i) has a ductility value of greater than or equal to about 2% to less than or equal to about 20% at a temperature above about 200° C.

19. A method of forming a hybrid material housing for a battery for reducing or minimizing thermal runaway propagation, the method comprising:
disposing a metal layer into a cavity of a mold;
disposing a preform comprising a reinforcing material and a polymer or precursor of a polymer into the cavity of the mold adjacent to the metal layer;
applying a coating comprising an intumescent material to the metal layer or the preform such that, in the cavity of the mold, the coating is disposed on the metal layer along an interface between the preform and the metal layer, the intumescent material comprising expandable graphite;
solidifying the polymer or precursor of the polymer to form a composite material comprising a polymeric matrix having the reinforcing material disposed therein; and
opening the mold to remove a hybrid material housing for a battery pack comprising a composite structure formed of the composite material, the metal layer, and the coating on the metal layer along the interface between the composite structure and the metal layer,
wherein the composite structure defines an exterior surface and an opposite interior surface that faces an interior compartment of the hybrid material housing, the metal layer is disposed along the exterior surface of the composite structure and the interior surface of the composite structure is an innermost surface of the housing adjacent the interior compartment,
wherein in a first operational mode the metal layer contacts the composite structure and in a second operational mode after the composite structure is exposed to a thermal load originating in the interior compartment of greater than or equal to about 500° C., the metal layer at least partially delaminates from the exterior surface and forms insulating air gaps that define a thermal barrier between the exterior surface of the composite structure and the metal layer, and
wherein the coating comprising the intumescent material further separates the metal layer from the composite structure in the second operational mode.

20. The method of claim 19, wherein after the disposing the reinforcing material, the method further comprises at least one of: heating the mold and applying pressure to the mold for compression.

* * * * *